United States Patent
Kinoshita

(10) Patent No.: US 9,189,671 B2
(45) Date of Patent: Nov. 17, 2015

(54) METHOD, DEVICE AND NON-TRANSITORY STORAGE MEDIUM STORING PROGRAM INSTRUCTIONS TO RECOGNIZE MAGNETIC INK CHARACTERS UTILIZING REFERENCE AND INPUT WAVEFORM SCALING

(71) Applicant: Seiko Epson Corporation, Tokyo (JP)

(72) Inventor: Yoshiaki Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 271 days.

(21) Appl. No.: 13/918,256

(22) Filed: Jun. 14, 2013

(65) Prior Publication Data

US 2013/0336570 A1  Dec. 19, 2013

(30) Foreign Application Priority Data

Jun. 14, 2012  (JP) ................. 2012-134564

(51) Int. Cl.
   *G06K 9/00*  (2006.01)
   *G06K 7/14*  (2006.01)
   *G06K 9/18*  (2006.01)

(52) U.S. Cl.
   CPC ............. *G06K 7/1404* (2013.01); *G06K 9/186* (2013.01)

(58) Field of Classification Search
   None
   See application file for complete search history.

(56) References Cited

U.S. PATENT DOCUMENTS

2013/0336569 A1  12/2013  Kinoshita

FOREIGN PATENT DOCUMENTS

JP  09-311906 A  12/1997
JP  2004-206362 A  7/2004

*Primary Examiner* — Nirav G Patel
(74) *Attorney, Agent, or Firm* — Nutter McClennen & Fish LLP

(57) ABSTRACT

The recognition rate is improved when recognizing magnetic ink characters. The character recognition unit of a check reader scales and adjusts the waveform of the reference waveform data for each magnetic ink character referenced to a scaling point set in each character, recognizes the read magnetic ink character based on the difference between the reference waveform data after adjustment and the character waveform data, and when there are three peaks exceeding a specific level in the reference waveform data, sets two scaling points F1, F2 in the waveform of the reference waveform data and scales the waveform of the reference waveform data referenced to the two scaling points F1, F2.

5 Claims, 10 Drawing Sheets

BOLD LINE: REFERENCE WAVEFORM DATA
THIN LINE: CHARACTER WAVEFORM DATA

METHOD, DEVICE AND NON-TRANSITORY STORAGE MEDIUM STORING PROGRAM INSTRUCTIONS TO RECOGNIZE MAGNETIC INK CHARACTERS UTILIZING REFERENCE AND INPUT WAVEFORM SCALING

Priority is claimed under 35 U.S.C. §119 from Japanese patent application No. JP 2012-134564 filed on Jun. 14, 2012, which is hereby incorporated by reference in its entirety.

BACKGROUND

1. Technical Field

The present invention relates to a recording media processing device, a method of controlling a recording media processing device, and a storage medium storing a program.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Such recording media processing devices identify (read) each character in the MICR line by magnetic ink character recognition, a process of extracting character waveform data in a range corresponding to one magnetic ink character from the signal waveform data obtained by reading the MICR line, and comparing the difference between the extracted character waveform data and reference waveform data defined by a particular standard for the characters to recognize each magnetic ink character.

Due to deviation in the character width of printed magnetic ink characters, or variation in the pitch when conveying the recording medium through the recording media processing device, distortion in the form of stretching or compression can appear in the waveform of the acquired character waveform data. When this happens, the difference between the character waveform data and the reference waveform data increases, and the recognition rate decreases. Methods of stretching or compressing (scaling) part of the waveform of the reference waveform data to reduce the effect of stretching or compression of the character data waveform and enable magnetic ink character recognition are known from the literature. Scaling the waveform of the reference waveform data is done by, for example, setting a scaling point at one point where the change per unit is small between peaks in the waveform of the reference waveform data, and stretching or compressing the waveform on the right side of this scaling point a specific distance in a specific range.

Some magnetic ink characters, however, have three peaks in the waveform of the reference waveform data. These characters also have at least two locations where the change per unit between peaks is small. Depending upon the character, therefore, scaling the waveform of the reference waveform data at only one scaling point may not improve the recognition rate.

SUMMARY

The present invention is directed to solving at least part of the foregoing problem, and provides a recording media processing device, control method, and storage medium as described below.

A recording media processing device according to one aspect of the invention has a magnetic reading unit that magnetically reads a magnetic ink character recorded on a recording medium; and a character recognition unit that recognizes the read magnetic ink character based on comparing reference waveform data for magnetic ink characters with character waveform data acquired by the magnetic reading unit reading the magnetic ink character. The character recognition unit adjusts by scaling the waveform of the reference waveform data for each magnetic ink character referenced to a scaling point set in each character; recognizes the read magnetic ink character based on the difference between the reference waveform data after adjustment and the character waveform data; and when there are three peaks exceeding a specific level in the reference waveform data, sets two scaling points in the waveform of the reference waveform data and scales the waveform of the reference waveform data referenced to the two scaling points.

When there are three peaks exceeding a specific level in the reference waveform data and two scaling points can be set, this aspect of the invention sets two scaling points in the waveform of the reference waveform data, and scales (stretches or compresses) the waveform of the reference waveform data referenced to the two scaling points. The difference between the waveform of the character waveform data and the waveform of the reference waveform data can therefore be reduced compared with scaling the waveform of the reference waveform data using only one scaling point when there is stretching or compression in the waveform of the read character waveform data. The magnetic ink character recognition rate can therefore be improved.

In a recording media processing device according to another aspect of the invention, the character recognition unit preferably makes a first adjustment that scales the waveform of the reference waveform data referenced to one of the two scaling points; makes a second adjustment that scales the waveform of the reference waveform data referenced to the other of the two scaling points; compares the difference between the character waveform data and the reference waveform data after the first adjustment with the difference between the character waveform data and the reference waveform data after the second adjustment; and recognizes the read magnetic ink character based on the smaller difference.

This aspect of the invention makes a first adjustment and a second adjustment that scale the waveform of the reference waveform data at two different scaling points. Because the read magnetic ink character is then recognized based on the smaller of the differences calculated after the adjustment, the difference between the waveform of the character waveform data and the waveform of the reference waveform data can be reduced and character recognition enabled. The magnetic ink character recognition rate can therefore be improved.

In a recording media processing device according to another aspect of the invention, the character recognition unit preferably scales the waveform of the reference waveform data based on two scaling points when the character is the number 6, number 7, amount symbol A, On-Us symbol O, or dash symbol D.

Because the waveforms of the reference waveform data for the number 6, number 7, amount symbol A, On-Us symbol O, and dash symbol D each have three peaks, the waveforms of the reference waveform data can be scaled referenced to two scaling points, and the magnetic ink character recognition rate can be improved.

Another aspect of the invention is a control method of a recording media processing device having a magnetic reading unit that magnetically reads a magnetic ink character recorded on a recording medium, and a character recognition unit that recognizes the read magnetic ink character based on comparing reference waveform data for magnetic ink characters with character waveform data acquired by the magnetic reading unit reading the magnetic ink character, the control method comprising steps of: adjusting by scaling the waveform of the reference waveform data for each magnetic ink character referenced to a scaling point set in each character; recognizing the read magnetic ink character based on the difference between the reference waveform data after adjustment and the character waveform data; and when there are three peaks exceeding a specific level in the reference waveform data, setting two scaling points in the waveform of the reference waveform data and scaling the waveform of the reference waveform data referenced to the two scaling points in the adjustment step.

When there are three peaks exceeding a specific level in the reference waveform data and two scaling points can be set, the method according to this aspect of the invention sets two scaling points in the waveform of the reference waveform data, and scales (stretches or compresses) the waveform of the reference waveform data referenced to the two scaling points. The difference between the waveform of the character waveform data and the waveform of the reference waveform data can therefore be reduced compared with scaling the waveform of the reference waveform data using only one scaling point when there is stretching or compression in the waveform of the read character waveform data. The magnetic ink character recognition rate can therefore be improved.

Another aspect of the invention is a computer-readable non-transitory storage medium storing a program executed by a control unit that controls parts of a recording media processing device having a magnetic reading unit that magnetically reads a magnetic ink character recorded on a recording medium, and a character recognition unit that recognizes the read magnetic ink character based on comparing reference waveform data for magnetic ink characters with character waveform data acquired by the magnetic reading unit reading the magnetic ink character, the program causing the control unit of the computer to execute steps of: adjusting by scaling the waveform of the reference waveform data for each magnetic ink character referenced to a scaling point set in each character; and recognizing the read magnetic ink character based on the difference between the reference waveform data after adjustment and the character waveform data; and in the adjustment step sets two scaling points in the waveform of the reference waveform data and scales the waveform of the reference waveform data referenced to the two scaling points when there are three peaks exceeding a specific level in the reference waveform data.

When there are three peaks exceeding a specific level in the reference waveform data and two scaling points can be set, the program according to this aspect of the invention sets two scaling points in the waveform of the reference waveform data, and scales (stretches or compresses) the waveform of the reference waveform data referenced to the two scaling points. The difference between the waveform of the character waveform data and the waveform of the reference waveform data can therefore be reduced compared with scaling the waveform of the reference waveform data using only one scaling point when there is stretching or compression in the waveform of the read character waveform data. The magnetic ink character recognition rate can therefore be improved.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a recording media processing device, and a method of controlling the recording media processing device according to the present invention are described below with reference to the accompanying figures. A recording media processing device according to this embodiment of the invention is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
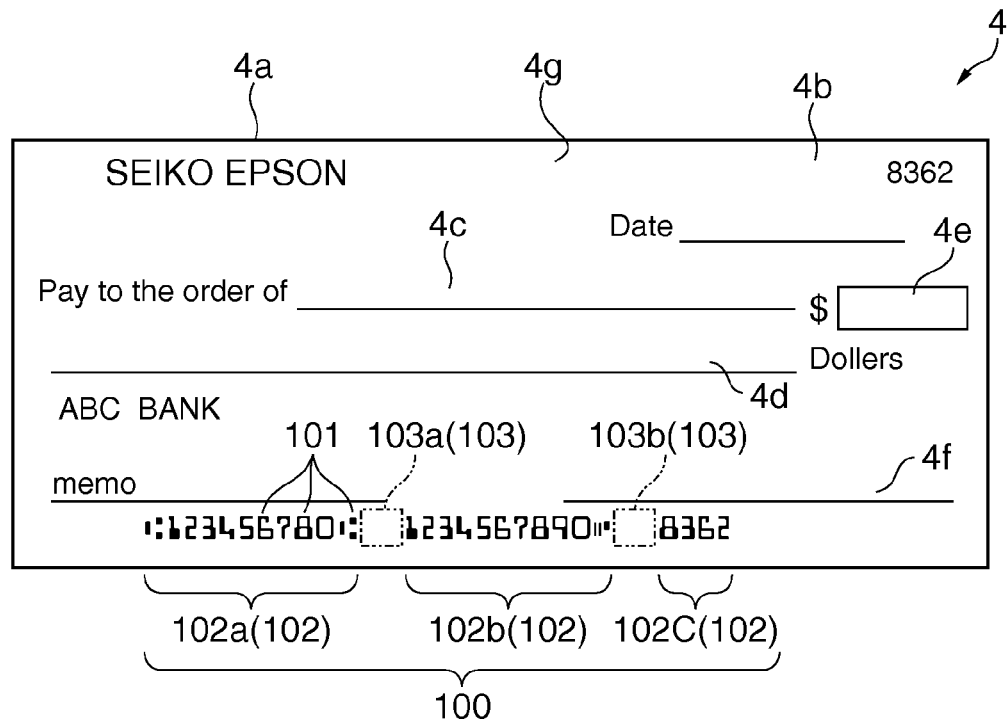
FIG. 1A shows an example of a check.
Figure 1B:
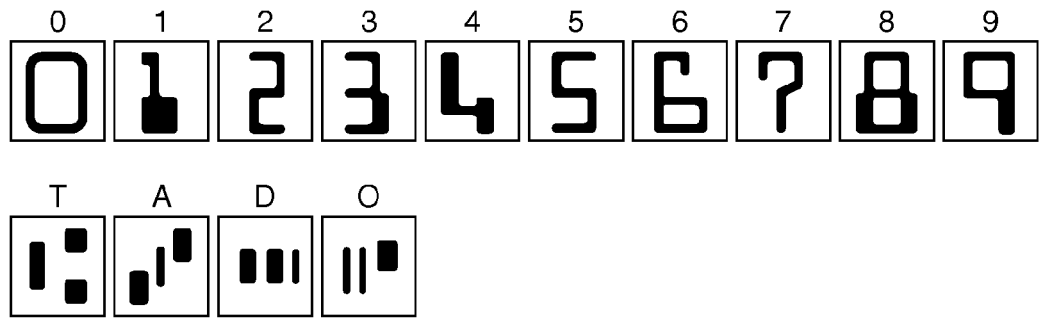
FIG. 1B shows examples of magnetic ink characters.

FIG. 1A and FIG. 1B show example of a check and magnetic ink characters. More specifically, FIG. 1A shows an example of a check, and FIG. 1B shows the characters in the E-13B MICR font.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example the fields 102a, 102b, 102c correspond from the left to the bank number, account number, and check number.

As indicated by the imaginary lines in FIG. 1A, a space character 103a is placed between fields 102a and 102b, and a space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as the E-13B font), and one magnetic ink character 101 corresponds to one of plural predefined characters.

As shown in FIG. 1B, the E-13B font consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 by offset printing or laser printing. The actual shapes of the magnetic ink characters 101 in the E-13B font produced by offset printing, and the magnetic ink characters 101 in the E-13B font produced by laser printing, may differ.

Recording Media Processing Device

A recording media processing device according to this embodiment of the invention is described next. A recording media processing device according to this embodiment of the invention includes a check reader 1 and host computer 70.

Figure 2:
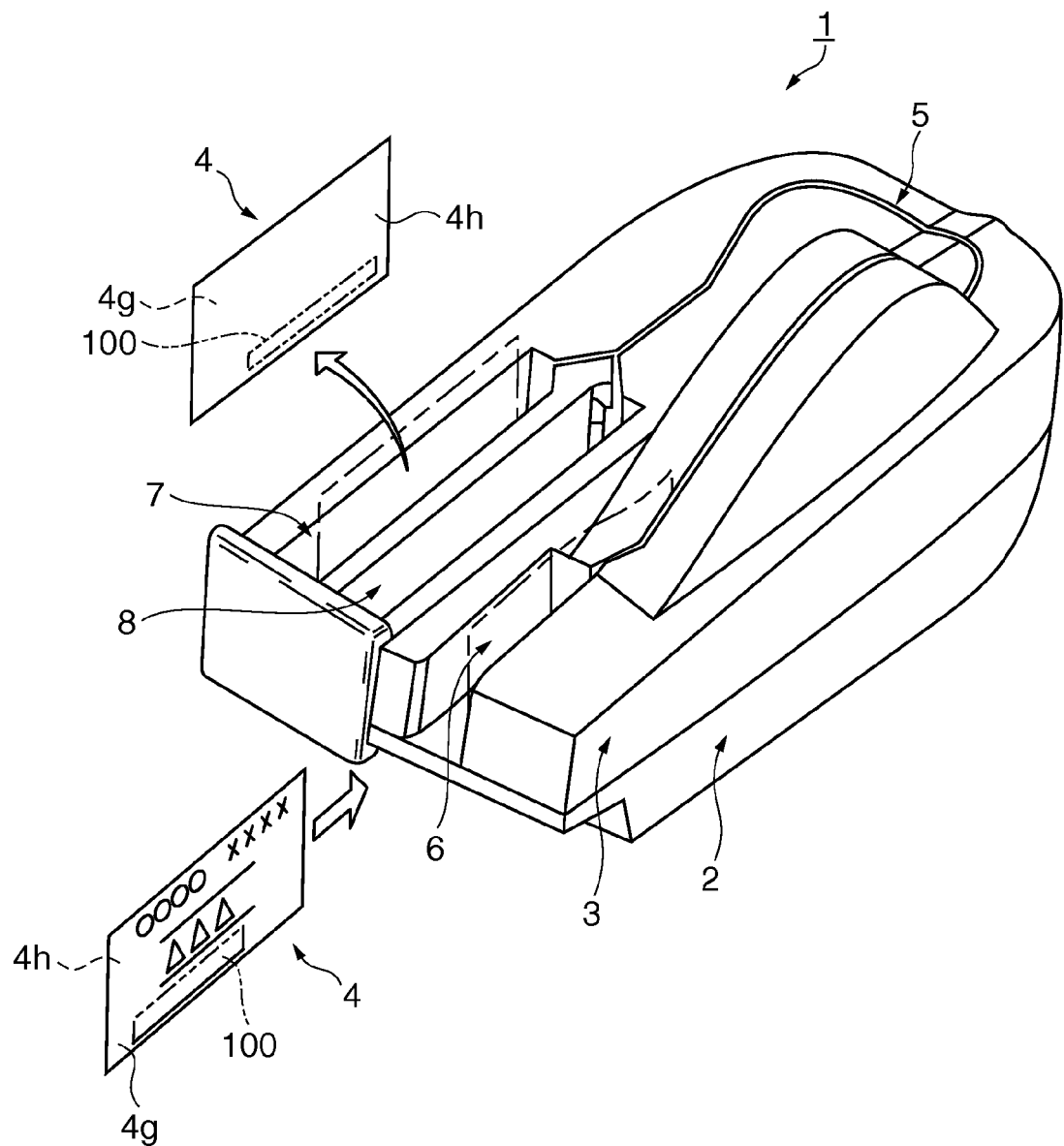
FIG. 2 is an oblique view of a check reader according to a preferred embodiment of the invention.

The basic configuration of a check reader 1 according to this embodiment of the invention is described first. FIG. 2 is an oblique view of the check reader 1 according to this embodiment of the invention. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
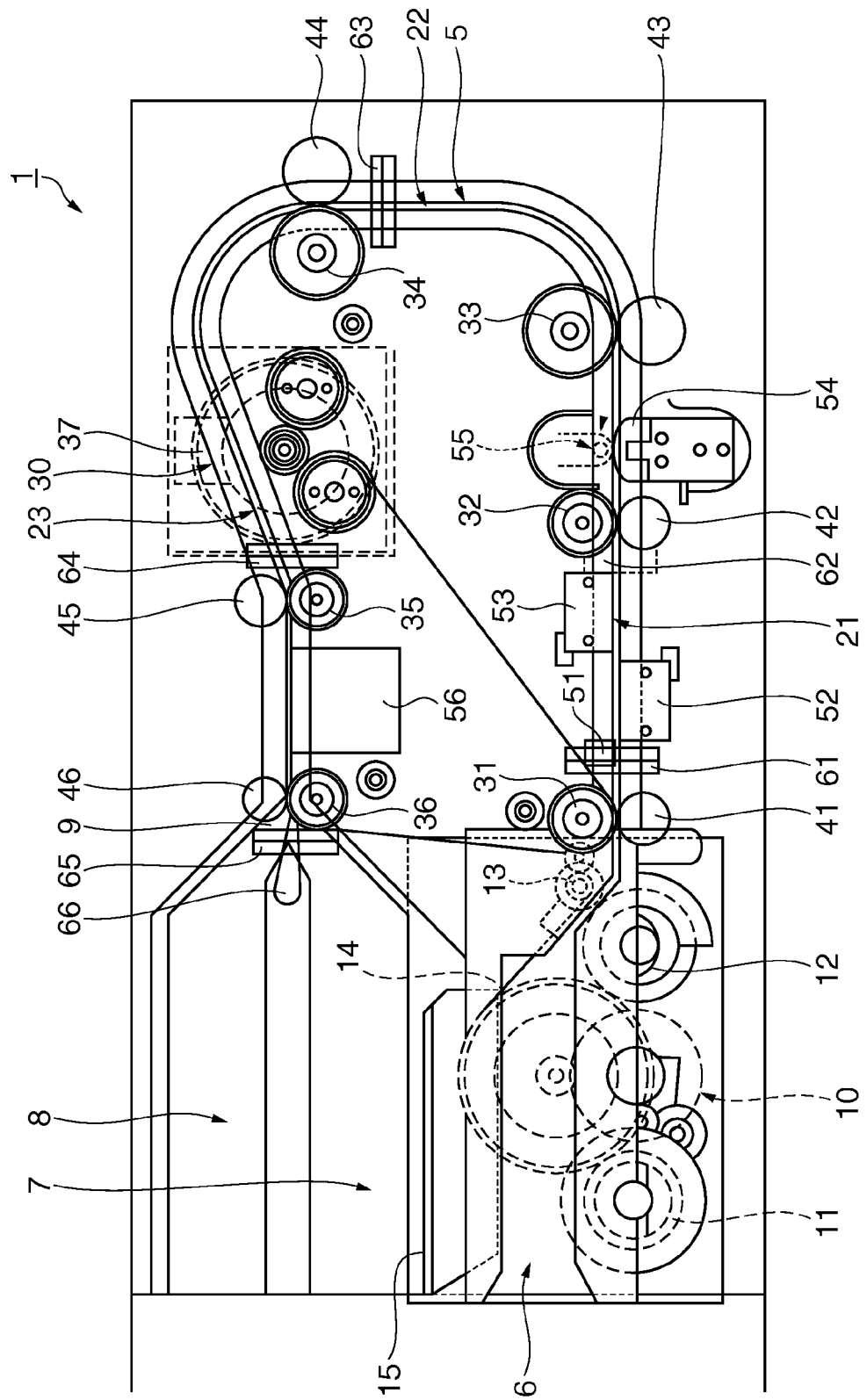
FIG. 3 shows the internal configuration of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4g of the check 4 conveyed through the conveyance path 5, and scans a front image, which is an image of the front 4g. The back contact image sensor 53 faces the back 4h of the check 4 conveyed through the conveyance path 5, and scans a back image, which is an image of the back 4h.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density of the magnetized MICR line 100 at a specific sampling period to acquire signal waveform data as the recording medium is conveyed past the magnetic head 54.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
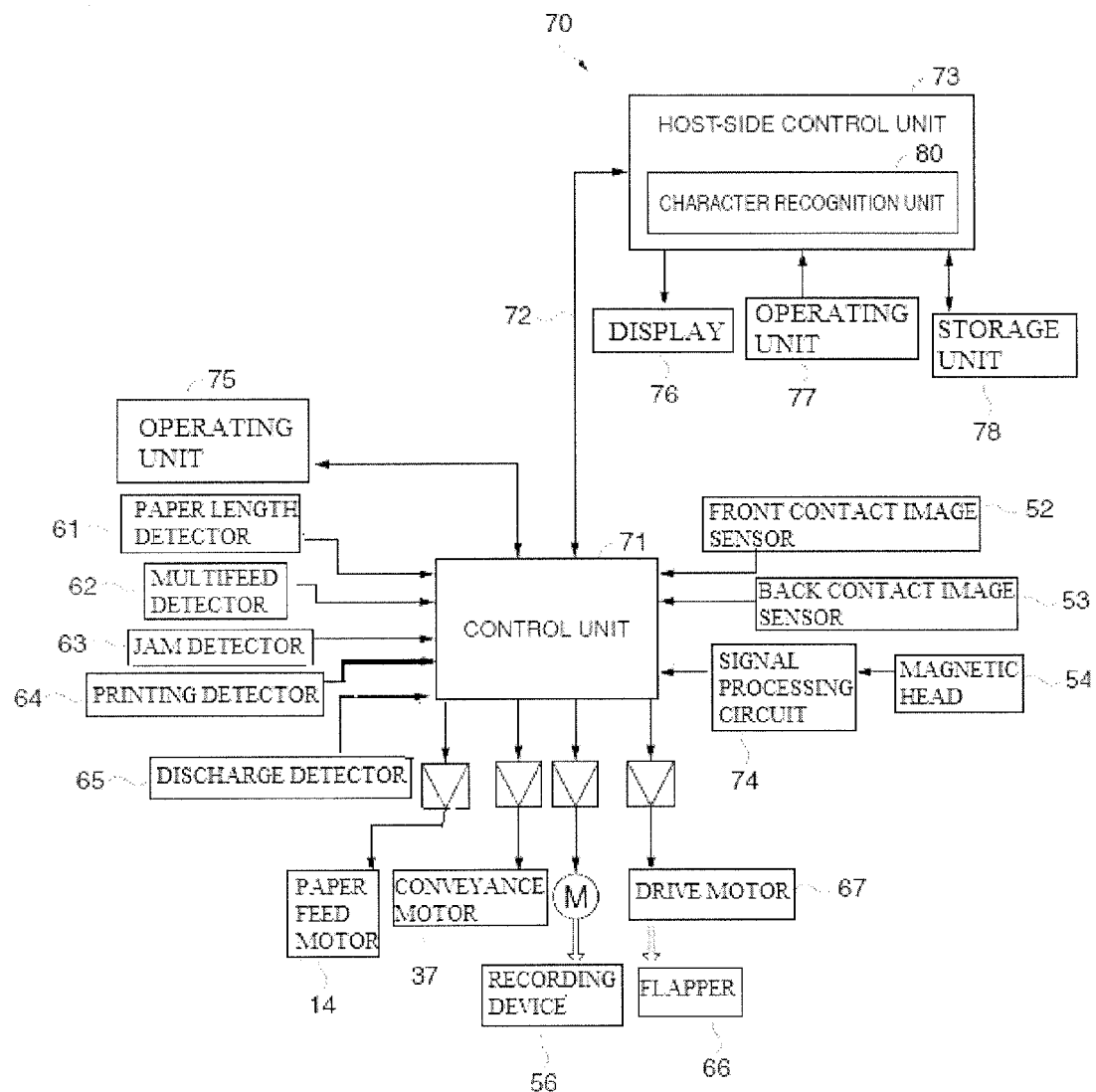
FIG. 4 is a block diagram showing the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and waveshapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In this embodiment of the invention the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data (commands) for controlling the control unit 71, and outputting the resulting control data to the control unit 71 of the check reader 1. The host computer 70 and check reader 1 in this embodiment of the invention thus cooperate to function as a recording media processing device for processing checks 4 as the recording medium.

Using a check 4 for a business transaction is described briefly next. The buyer of some product writes the date, payee, amount (in numbers and words), and signature in the fields 4b, 4c, 4d, 4e, 4f of the check form 4a (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition refers to identifying (recognizing) each magnetic ink character 101 in the magnetic ink characters 101 that were read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
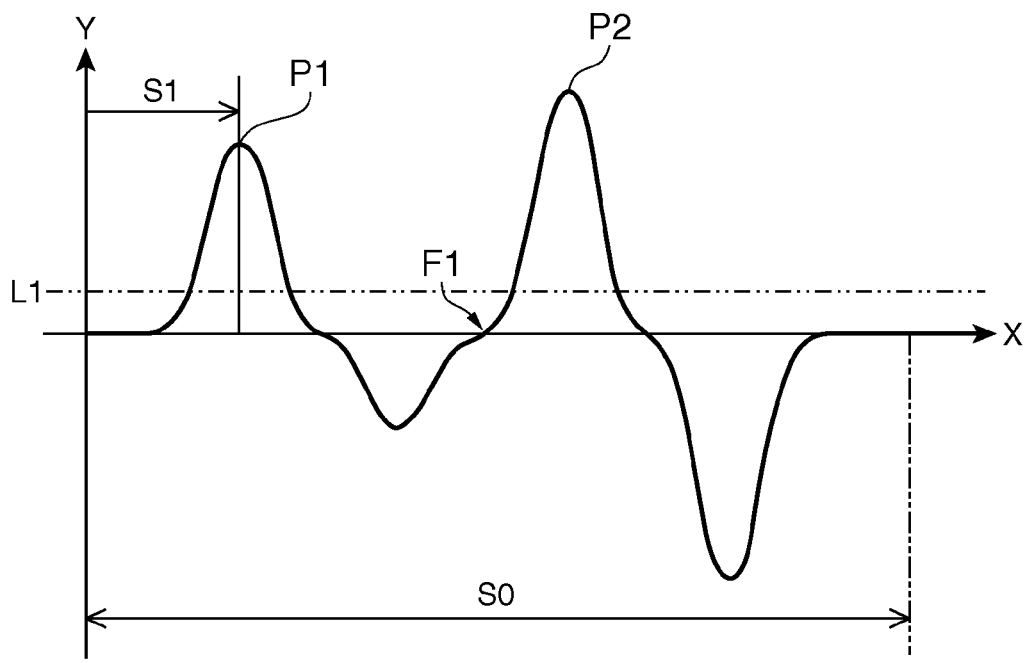
FIG. 5A shows an example of character waveform data.
Figure 5B:
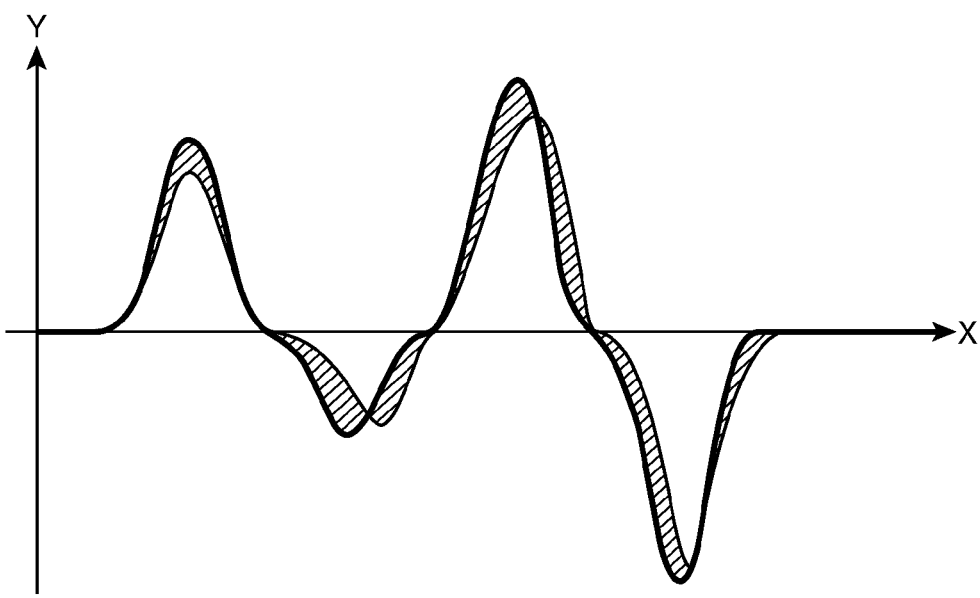
FIG. 5B shows an example of the difference between character waveform data and reference waveform data.

FIG. 5A and FIG. 5B show an example of character waveform data. More specifically, FIG. 5A shows the character waveform data for one character in the magnetic ink character 101 set, and FIG. 5B describes the difference between the character waveform data and reference waveform data. FIG. 5A and FIG. 5B show the character waveform data for the number 4.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and seven sampling units are referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, the amplitude of the character waveform data (change on the y-axis) is divided into 256 levels, and level 128 is at the origin (0 level).

Relative change in magnetic flux density during each specific sampling period is shown in FIG. 5A from the origin to the right on the x-axis (from the right side to the left side of the number 4 shown in FIG. 1B). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that first peak P1, which is the first peak detected, is at specific period S1 from the start of character extraction in the character waveform data for one character.

In this embodiment the period S0 occupied by the waveform for one character is 70 sampling units (10 mesh) and the specific period S1 is 11 sampling units, for example. The character recognition unit 80 therefore analyzes the signal waveform data, and of the waveform peaks exceeding a specific level L1, detects the first peak P1 that appears from the origin to the end of the waveform (right on the x-axis) as the first peak.

A peak is a high or low point in the signal waveform data, and these peaks appear at a specific period along the x-axis. Peaks on the positive side are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first peak P1 is at the eleventh sampling unit on the x-axis of the extracted waveform. The character recognition unit 80 then extracts the character waveform data in the 70 sampling units (10 mesh) occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters.

The character recognition unit 80 then recognizes each of the magnetic ink characters 101 in the MICR line 100 from the extracted character waveform data based on specific recognition conditions. The magnetic ink character 101 recognition process either identifies the magnetic ink character 101 that was read, or determines that character recognition is not possible. Character recognition is further described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

If the difference between the character waveform data and the reference waveform data used as the first candidate is less than or equal to the threshold as a result of comparing the difference with the threshold, and the difference between the character waveform data and the reference waveform data used as the second candidate is greater than the threshold, the character recognition unit 80 determines that the magnetic ink character 101 was recognized, and confirms the character selected as the first candidate as the recognized character obtained by character recognition.

The threshold used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

Characters are recognized using a simple comparison and a sliding comparison in the first recognition phase and third recognition phase of the character recognition process described below. A simple comparison means simply comparing the waveform of the character waveform data for the target character with the waveform of the reference waveform data. A sliding comparison means sliding the waveform of the character waveform data for the target character and the waveform of the reference waveform data a specific distance (number of sampling units) in a specific range for comparison.

Stretching or compression of the waveform on the x-axis may occur in the acquired character waveform data due to variation in the character width of the magnetic ink characters 101 printed on the check 4, or deviation in the pitch while conveying the check 4 through the check reader 1, for example. When this happens, the difference between the reference waveform data and character waveform data may increase even though the reference waveform data is for the character corresponding to the target character when the difference between the character waveform data of the target character and the reference waveform data is calculated by a simple comparison or sliding comparison. The target character is then determined unrecognizable by magnetic character recognition, and the recognition rate drops.

This embodiment of the invention therefore reduces the effect of stretching or compression of the character data waveform on recognition by scaling and adjusting the waveform of the reference waveform data for the character compared with the target character, and calculating the difference between the character waveform data of the target character and the adjusted reference waveform data, in the second recognition phase and fourth recognition phase of the character recognition process described below.

Using the waveform of the number 4 shown in FIG. 5A for example, the process of scaling the waveform of the reference waveform data sets a scaling point F1 as a reference point, and slides the waveform on the right side (right on the x-axis) of the FIG. 1 a specific distance (number of sampling units) in a specific range. This scaling point F1 is set at one point between the first peak P1 and the second peak P2 where the change per sampling unit is small (the point where the signal level on the y-axis crosses the origin (0 level)), for example.

Note that if the scaling point F1 is set to a position where this change is great, the difference to the character waveform data may be increased by sliding only part of the waveform of the reference waveform data. The scaling point F1 is therefore preferably set to a point where the change is small. The specific range and the specific distance that the waveform is slid are set according to the shape of the waveform of the reference waveform data for each character.

Figure 6A:
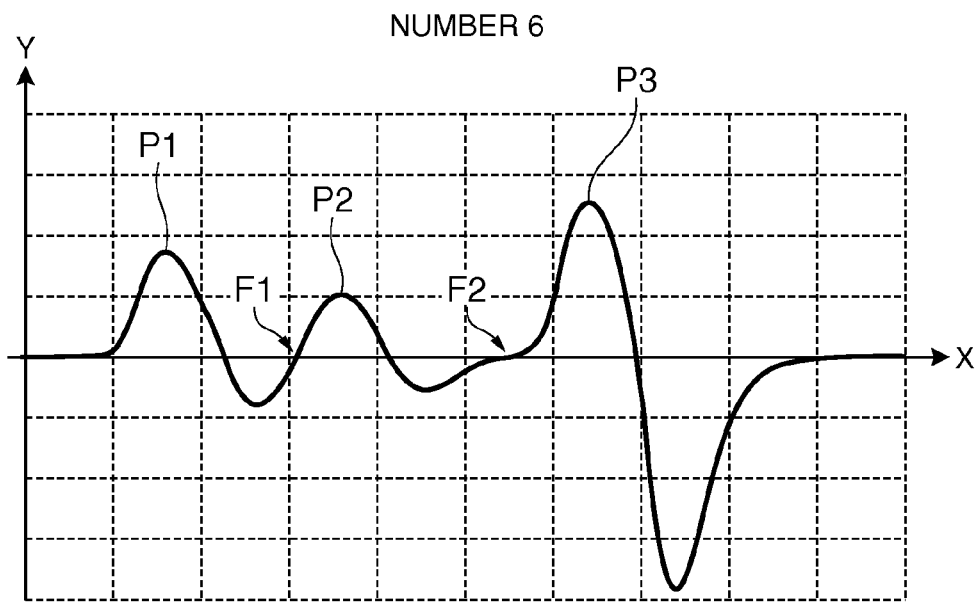
FIG. 6A shows an example of reference waveform data for a character with three peaks.
Figure 6B:
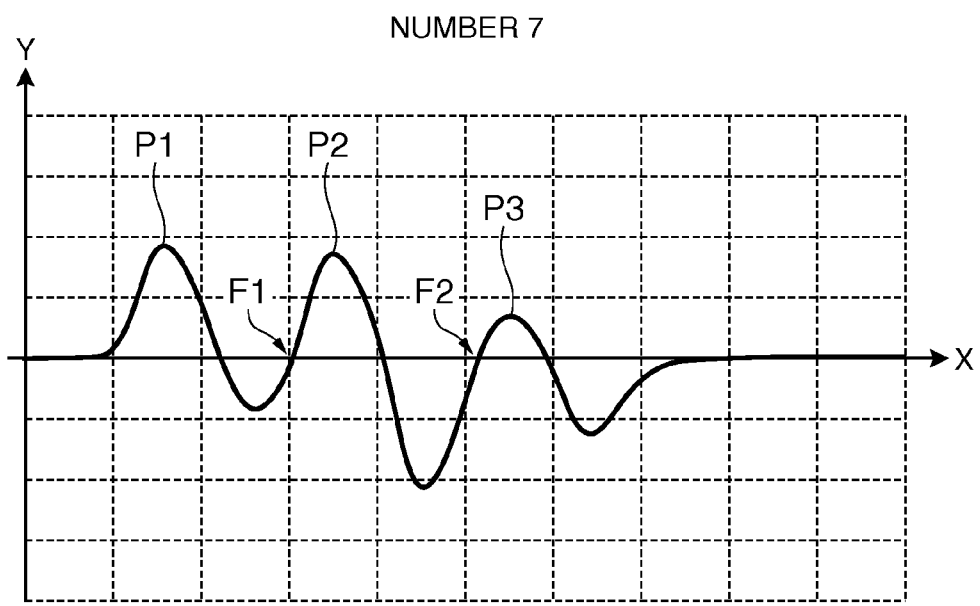
FIG. 6B shows another example of reference waveform data for a character with three peaks.
Figure 7A:
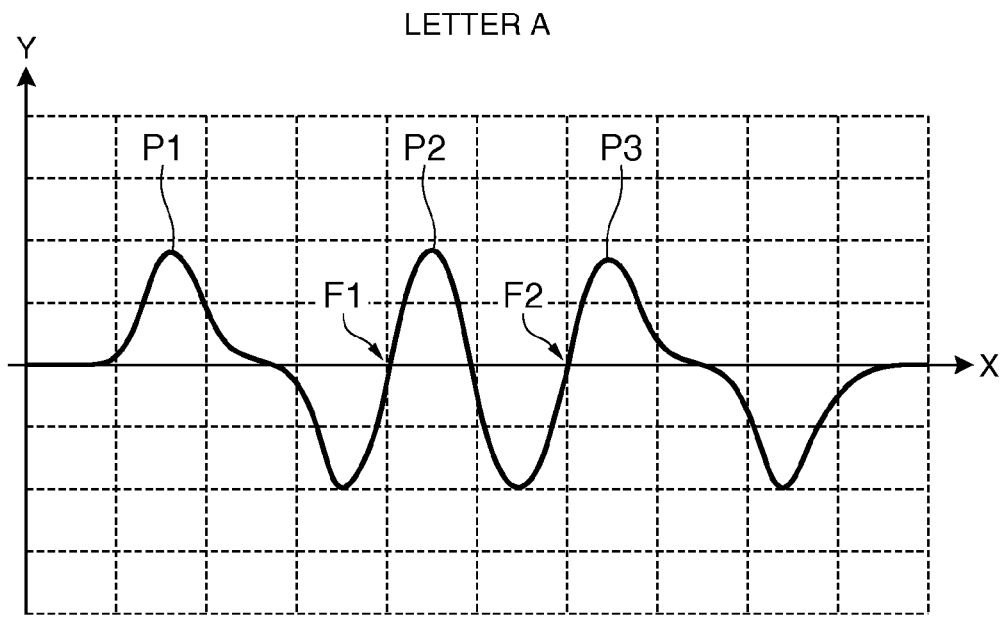
FIG. 7A shows another example of reference waveform data for a character with three peaks.
Figure 7B:
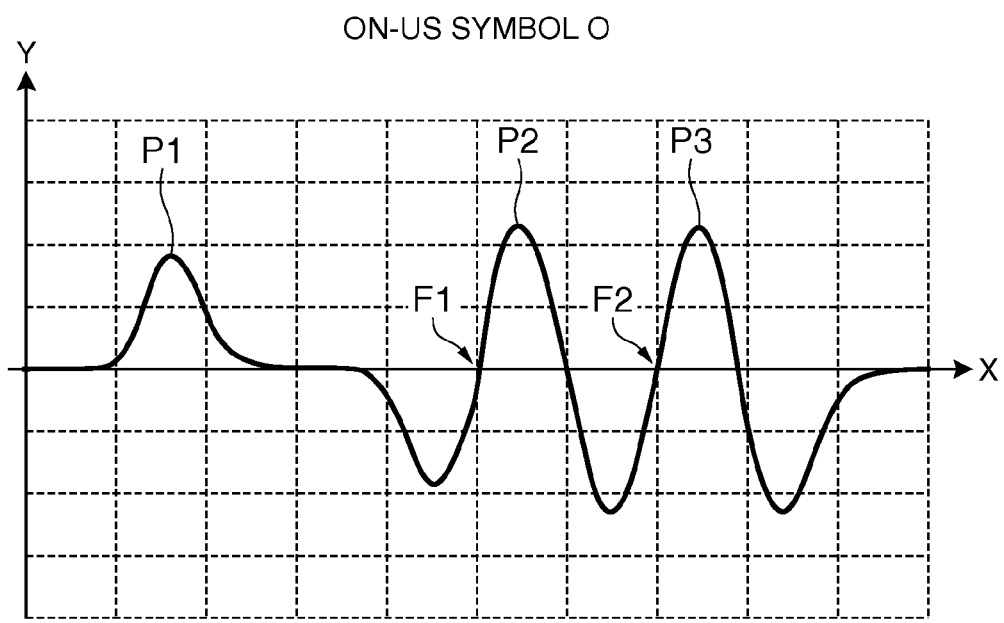
FIG. 7B shows another example of reference waveform data for a character with three peaks.
Figure 8:
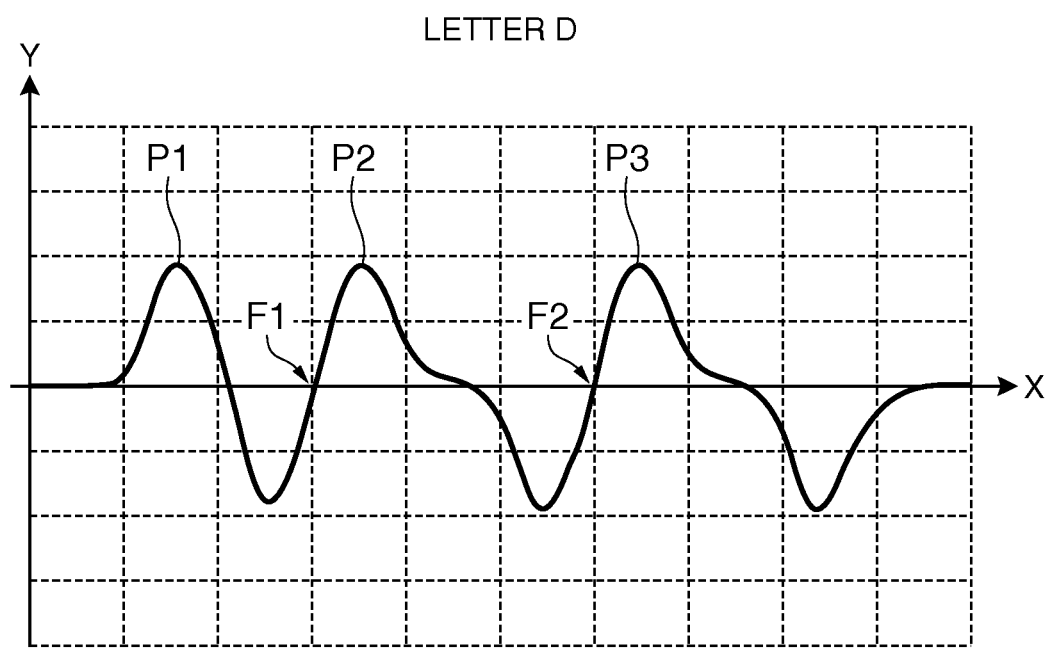
FIG. 8 shows another example of reference waveform data for a character with three peaks.

There are three peaks in the waveform of the reference waveform data for some magnetic ink characters 101, however. FIG. 6A to FIG. 8 show reference waveform data for some characters that have three peaks. More specifically, FIG. 6A shows the reference waveform data for the number 6, FIG. 6B shows the reference waveform data for the number 7. FIG. 7A shows reference waveform data for the amount symbol A, and FIG. 7B shows reference waveform data for the On-Us symbol O. FIG. 8 shows reference waveform data for the dash symbol D. Note that the scale of the x-axis in FIG. 6A to FIG. 8 is 1 mesh unit.

As shown in FIG. 6A to FIG. 8, the waveforms of the reference waveform data for the number 6, number 7, amount symbol A, On-Us symbol O, and dash symbol D each have three peaks, a first peak P1, second peak P2, and third peak P3. There are therefore two locations between the three peaks where the change per sampling unit is small (where the value on the y-axis is 0) in the waveforms of the reference waveform data for these numbers and symbols. The recognition rate may therefore not be improved for these numbers and symbols by sliding the waveform of the reference waveform data at only one scaling point.

This embodiment of the invention therefore sets two scaling points, scaling point F1 and scaling point F2, in the waveforms of the reference waveform data for the number 6, number 7, amount symbol A, On-Us symbol O, and dash symbol D shown in FIG. 6A to FIG. 8. More specifically, in addition to setting a scaling point F1 at the position between first peak P1 and second peak P2 where the change is small, this embodiment sets a scaling point F2 at the position between second peak P2 and third peak P3 where the change is small. The waveform to the right of scaling point F1 (right on the x-axis), and the waveform to the right of scaling point F2, are then both slid and adjusted a specific distance in a specific range.

Character Recognition Process

Figure 9:
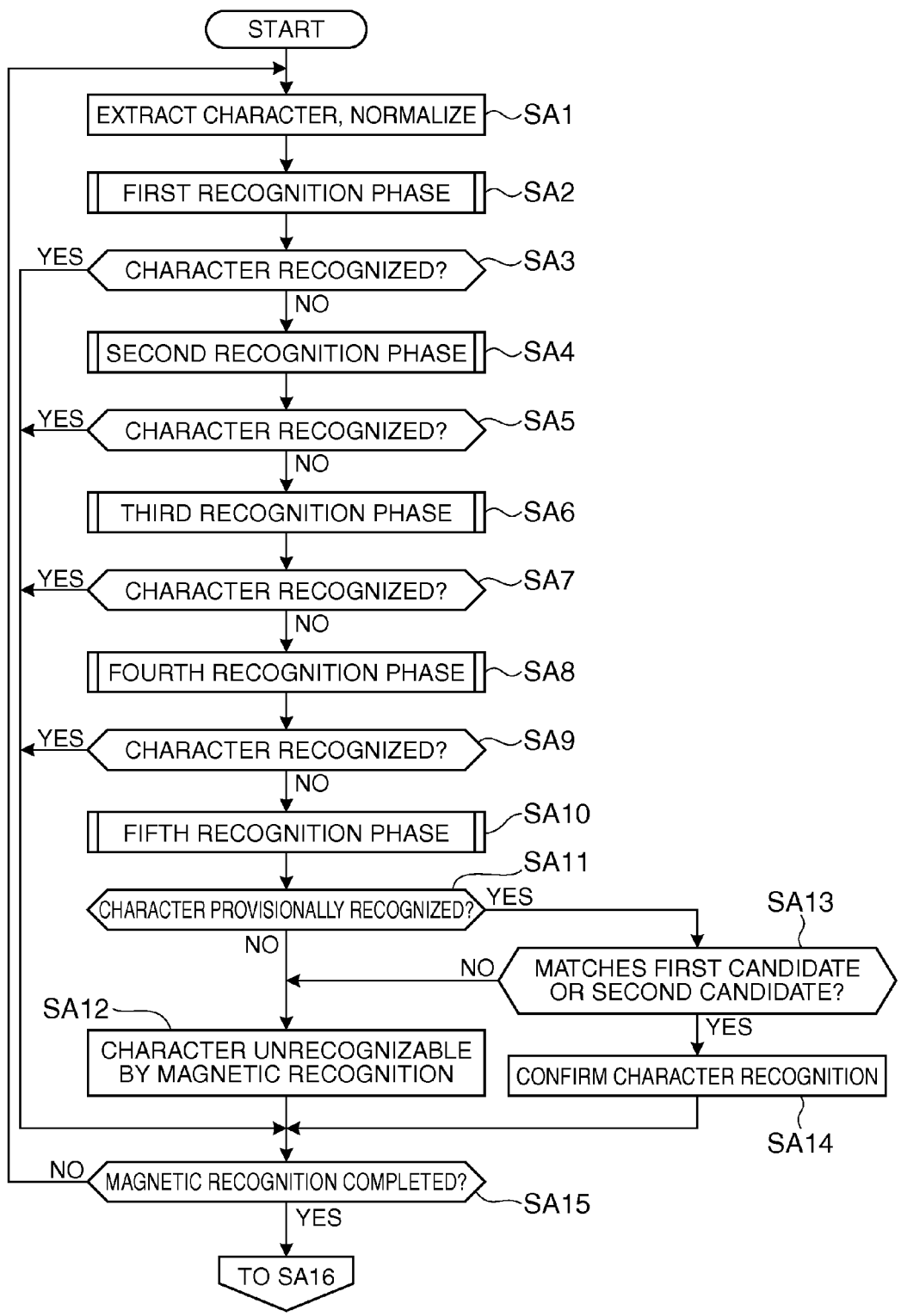
FIG. 9 is a flow chart describing the character recognition process in a check reader according to the invention.
Figure 10:
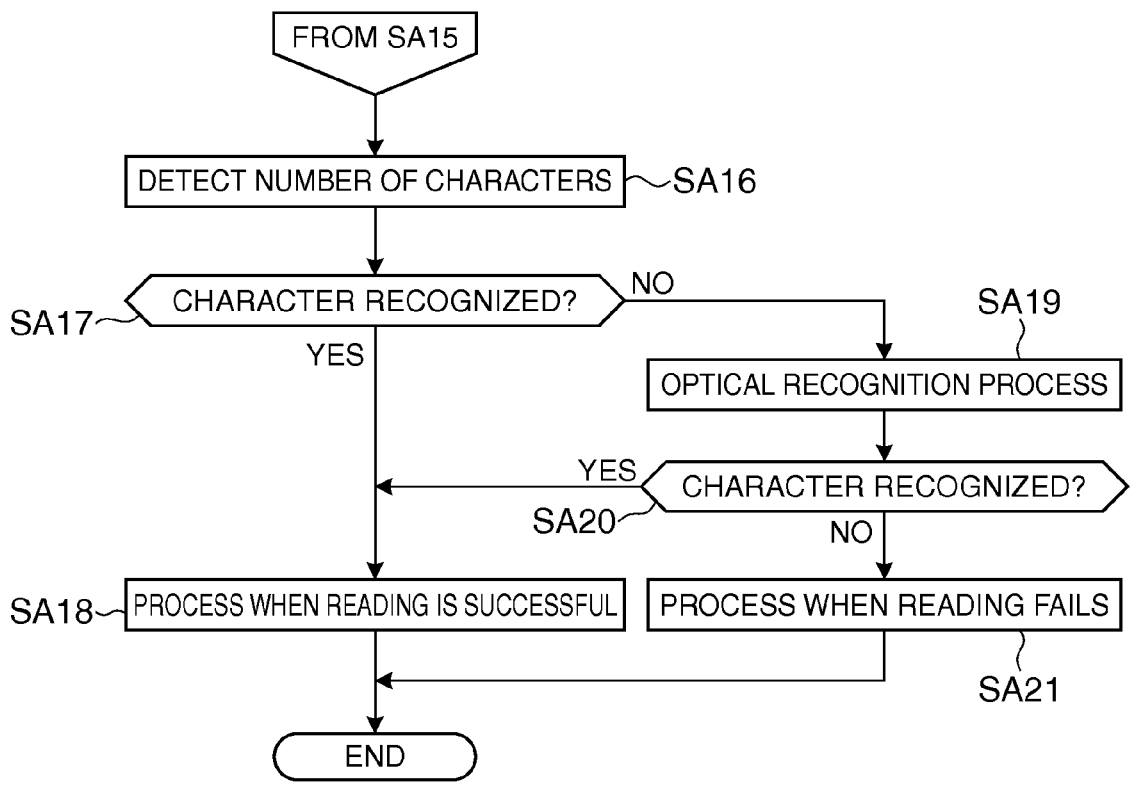
FIG. 10 is a flow chart describing the character recognition process in a check reader according to the invention.

The character recognition process in the check reader 1 according to this embodiment of the invention is described next. FIG. 9 and FIG. 10 are flow charts describing the character recognition process in a check reader according to this embodiment.

The MICR line 100 recorded on the check 4 is read by the magnetic head 54 before step SA1 in FIG. 9. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first peak P1 (FIG. 5A) used as the reference for the start character extraction position is detected in the acquired signal waveform data. Based on the position of the detected first peak P1, the character recognition unit 80 extracts character waveform data for one character corresponding to a magnetic ink character 101 from the signal waveform data, and applies a normalization process to the extracted character waveform data.

The magnetic recognition process described from step SA2 below has five recognition phases from a first recognition phase in step SA2 to a fifth recognition phase in step SA10. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase.

If the target character cannot be recognized in these five recognition phases, the optical recognition process described below in step SA19 (FIG. 10) is applied to the target character.

As described above, the shapes of magnetic ink characters 101 printed by offset and laser printing processes may differ slightly. The reference waveform data therefore includes reference waveform data for offset printing, and reference waveform data for laser printing. This embodiment uses the reference waveform data for offset printing in the first and second recognition phases, and uses reference waveform data for laser printing in the third and fourth recognition phases.

In the first recognition phase in step SA2, the character recognition unit 80 calculates the difference between the character waveform data for the target character and the reference waveform data for the 14 MICR characters by means of a simple comparison and a sliding comparison. As described above, if the difference between the character waveform data and the reference waveform data of the first candidate character is less than or equal to the threshold, and the difference between the character waveform data and the reference waveform data of the second candidate character is greater than the threshold, recognition of the target character is confirmed. The first recognition phase ends without applying the sliding comparison if the target character is successfully recognized as a result of the simple comparison.

In step SA3, the character recognition unit 80 determines if the target character was recognized in the first recognition phase in step SA2. If the target character was recognized (step SA3 returns YES), the character recognition unit 80 goes to step SA15 instead of going to step SA4 because the character was recognized. If the target character was not recognized (step SA3 returns NO), the character recognition unit 80 goes to step SA4.

In the second recognition phase in step SA4, the character recognition unit 80 slides and adjusts the waveform of the reference waveform data for the compared character, and calculates the difference between the waveform of the character waveform data for the target character and each of the adjusted reference waveforms.

The scaling (sliding) process is applied once each to the two scaling points F1 and F2 in the reference waveform data for the characters with three peaks P1, P2, P3, that is, the number 6, number 7, amount symbol A, On-Us symbol O, and dash symbol D. More specifically, a first adjustment step that slides and adjusts the waveform to the right of the scaling point F1 is applied referenced to scaling point F1, and the difference to the character waveform data is calculated. Next, a second adjustment step that slides and adjusts the waveform to the right of scaling point F2 is applied referenced to scaling point F2, and the difference to the character waveform data is calculated. The difference after the first adjustment and the difference after the second adjustment are then compared, and the first and second candidate characters are determined using the differences with a smaller value.

For numbers and symbols with only two peaks P1 and P2 (one scaling point F1), adjustment that slides and adjusts the waveform to the right of the scaling point F1 is applied referenced to scaling point F1, the difference to the character waveform data is calculated, and first and second candidate characters are determined. The character recognition unit 80 then determines that the target character was recognized if the difference between the character waveform data and the reference waveform data for the first candidate is less than or equal to the threshold, and the difference between the character waveform data and the reference waveform data of the second candidate exceeds the threshold.

In the next step SA5, the character recognition unit 80 determines if the target character was recognized in the second recognition phase in step SA4. If the target character was recognized (step SA5 returns YES), the character recognition unit 80 skips the third recognition phase and goes directly to step SA15. If the target character was not recognized (step SA5 returns NO), the character recognition unit 80 executes the third recognition phase in step SA6.

The third recognition phase in step SA6 uses the reference waveform data for laser printing, the operation is the same as in the first recognition phase of step SA2, and further description thereof is thus omitted.

In step SA7 following the third recognition phase, the character recognition unit 80 determines if the target character was recognized in the third recognition phase in step SA6.

If the target character was recognized (step SA7 returns YES), the character recognition unit 80 skips the fourth recognition phase and goes directly to step SA15. If the target character was not recognized (step SA7 returns NO), the character recognition unit 80 goes to step SA8.

The fourth recognition phase in step SA8 uses the reference waveform data for laser printing, and the operation is the same as in the second recognition phase of step SA6.

In the fourth recognition phase, the first adjustment and second adjustment steps respectively referenced to the scaling point F1 and scaling point F2 are applied to the reference waveform data of the characters with three peaks P1, P2, P3, that is, the number 6, number 7, amount symbol A, On-Us symbol O, and dash symbol D. Adjustment referenced to the scaling point F1 is applied once for other numbers and symbols.

In the next step SA9, the character recognition unit 80 determines if the target character was recognized in the fourth recognition phase in step SA8. If the target character was recognized (step SA9 returns YES), the character recognition unit 80 skips the fifth recognition phase and goes directly to step SA15. If the target character was not recognized (step SA9 returns NO), the character recognition unit 80 executes the fifth recognition phase in step SA10.

Instead of comparing all sampling units, the fifth recognition phase in step SA14 compares the waveform of the target character waveform data and the waveform of the reference waveform data at the positions of the peaks and the sampling units therebefore and after in the reference waveform data. This eliminates the effect of distortion of the waveform of the character waveform data of the target character, and enables recognizing the target character with consideration for stretching, compression, and shifting in parts of the waveform.

The fifth recognition phase does not confirm recognition of the target character as in the other recognition phases, and recognition of the target character is confirmed only if a specific condition is met as described below. Confirmation of target character recognition in the fifth recognition phase is therefore referred to as "provisional confirmation" below. This is because while the other recognition phases recognize magnetic ink characters using the difference in all sampling units, the fifth recognition phase recognizes magnetic ink characters using the results of comparing the waveform of the character waveform data and the waveform of the reference waveform data in specific sampling units.

In the next step SA11, the character recognition unit 80 determines if the target character was provisionally recognized in the fifth recognition phase. If recognition of the target character was not provisionally confirmed (step SA11 returns NO), that is, if the target character could not be recognized in any of the first to fifth recognition phases, the character recognition unit 80 determines that the target character cannot be recognized by magnetic recognition (step SA12), and goes to step SA15.

If recognition of the target character is provisionally confirmed in the fifth recognition phase (step SA11 returns YES), the character recognition unit 80 determines if there is a match between the character provisionally recognized in the fifth recognition phase and the character used as the first or second candidate character in the preceding recognition phases (step SA13). Whether there is a match between the character provisionally recognized in the fifth recognition phase and either the first or second candidate character in the second recognition phase is determined in this example.

If the characters do not match (step SA13 returns NO), the character recognition unit 80 determines that the target character cannot be recognized by magnetic recognition (step SA12), and goes to step SA15. If there is a match (step SA13 returns YES), the character recognition unit 80 confirms that the target character is the character that was provisionally recognized in the fifth recognition phase (step SA14), and goes to step SA15.

In step SA15, the character recognition unit 80 determines if the magnetic recognition process was completed, that is, if all magnetic ink characters 101 in the MICR line 100 were processed as the target character. If the magnetic recognition process was completed (step SA15 returns YES), the character recognition unit 80 goes to step SA16 in FIG. 10. If the magnetic recognition process is not completed (step SA15 returns NO), the character recognition unit 80 returns to step SA1 and magnetically recognizes the next target character.

In step SA16 in FIG. 10, the character recognition unit 80 detects the number of characters in the recognition string. In step SA17, the character recognition unit 80 determines if all characters contained in the recognition string, that is, all magnetic ink characters 101 in the MICR line 100, were recognized.

If all characters were recognized (step SA17 returns YES), the host-side control unit 73 determines that reading the MICR line 100 was successful and in step SA18 executes the process that is performed when the MICR line 100 is successfully read. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one character in the recognition string that could not be recognized (step SA17 returns NO), the character recognition unit 80 executes the optical recognition process in step SA19 to optically recognize target characters not recognized by magnetic recognition.

In the optical recognition process of step SA19, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA19 may recognize a target character that was not recognized in the magnetic recognition process based on the result of optical recognition, or provisionally recognize the character based on the result of optical recognition and confirm recognition if the provisionally recognized character matches the first candidate or second candidate used in the magnetic recognition process.

In step SA20, the character recognition unit 80 determines if all magnetic ink characters 101 that were not recognized by magnetic recognition were recognized by the optical recognition process in step SA19. If all magnetic ink characters 101 are recognized (step SA20 returns YES), the character recognition unit 80 executes the operation performed in step SA18 when the MICR line 100 is successfully read.

However, if there is even only one magnetic ink character that could not be recognized (step SA20 returns NO), the host-side control unit 73 executes the operation performed in step SA21 when reading the MICR line 100 fails. The operation performed when reading the MICR line 100 fails discharges the check 4 without printing an endorsement image, for example. The discharged check 4 is then examined to determine why reading failed, or is read again, for example.

The character recognition process of the check reader 1 according to this embodiment of the invention ends as described above.

The effect of a recording media processing device, control method of a recording media processing device, and program according to the invention as described above is described below.

(1) When the reference waveform data has three peaks exceeding a specific level and two scaling points can be set, the invention sets two scaling points in the waveform of the reference waveform data and scales the waveform of the reference waveform data referenced to these two scaling points F1 and F2. Compared with scaling the waveform of the reference waveform data at only one scaling point F1, this enables reducing the difference between the waveform of the character waveform data and the waveform of the reference waveform data when there is stretching or compression in the waveform of the read character waveform data. As a result, the magnetic ink character 101 recognition rate can be improved.

(2) A first adjustment step and a second adjustment step scale the waveform of the reference waveform data referenced to the two scaling points F1 and F2. Because the magnetic ink character 101 that was read is then recognized based on the smaller of the differences calculated after waveform adjustment, the difference between the waveform of the character waveform data and the waveform of the reference waveform data can be further reduced to enable character recognition. As a result, the recognition rate of magnetic ink characters 101 can be improved.

(3) Because the waveforms of the reference waveform data for the number 6, number 7, amount symbol A, On-Us symbol O, and dash symbol D each have three peaks, the waveform of the reference waveform data can be scaled referenced to two scaling points F1 and F2, and the magnetic ink character 101 recognition rate can be improved.

A preferred embodiment of the invention is described above, but the invention is not limited thereto and can obviously be modified and adapted as desired within the scope of the invention.

For example, the embodiment described above applies the scaling process once to each of the two scaling points F1 and F2 (executes a first adjustment step and a second adjustment step) in the reference waveform data for characters that have three peaks P1, P2, P3 in the second recognition phase of step SA4 and the fourth recognition phase of step SA8, but the invention is not so limited. A configuration that slides the waveform from the right side of scaling point F1 to before (the left side of) scaling point F2, and the waveform to the right from scaling point F2, in a single scaling step is also conceivable. However, scaling the waveform once based on the two scaling points F1 and F2 can actually increase the difference between the reference waveform data and the character waveform data in some situations. A configuration having a step of deciding, based on the stretching or compression of the read character waveform data, whether to apply the scaling process referenced to each scaling point F1 and F2 once, or apply the scaling process once referenced to both scaling points F1 and F2 at the same time, is also conceivable.

For example, the magnetic recognition process has five magnetic recognition phases in the embodiment described above, but the invention is not so limited. The magnetic recognition process does not need to include all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The foregoing embodiment includes an optical recognition process, but the invention is not so limited. The optical recognition process may be omitted when a desired recognition rate is achieved in the magnetic recognition phase.

The functions of parts of the check reader 1 and the control method of the check reader 1 described in the foregoing embodiment can also be achieved by storing all or part of the foregoing program on a floppy disk, hard disk, optical disc, magneto-optical disc, Compact Disc, flash ROM, or other storage medium, and installing the program on a personal computer.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording media processing device comprising:
   a magnetic reading unit that magnetically reads a magnetic ink character recorded on a recording medium; and
   a character recognition unit including a computer having a CPU and a memory, wherein the character recognition unit recognizes the read magnetic ink character based on comparing reference waveform data for magnetic ink characters with character waveform data acquired by the magnetic reading unit reading the magnetic ink character,
   adjusts by scaling the waveform of the reference waveform data for each magnetic ink character referenced to a scaling point set in each character,
   recognizes the read magnetic ink character based on the difference between the reference waveform data after adjustment and the character waveform data, and
   when there are three peaks exceeding a specific level in the reference waveform data, sets two scaling points in the waveform of the reference waveform data and scales the waveform of the reference waveform data referenced to the two scaling points;
   wherein the character recognition unit makes a first adjustment that scales the waveform of the reference waveform data referenced to one of the two scaling points,
   makes a second adjustment that scales the waveform of the reference waveform data referenced to the other of the two scaling points,
   compares the difference between the character waveform data and the reference waveform data after the first adjustment with the difference between the character waveform data and the reference waveform data after the second adjustment, and
   recognizes the read magnetic ink character based on the smaller difference.

2. The recording media processing device described in claim 1, wherein:
   the character recognition unit scales the waveform of the reference waveform data based on two scaling points when the character is the number 6, number 7, amount symbol A, On-Us symbol O, or dash symbol D.

3. A control method of a recording media processing device having a magnetic reading unit that magnetically reads a magnetic ink character recorded on a recording medium, and a character recognition unit that recognizes the read magnetic inkcharacter based on comparing reference waveform data for magnetic ink characters with character waveform data acquired by the magnetic reading unit reading the magnetic ink character, the control method comprising steps of:
   adjusting by scaling the waveform of the reference waveform data for each magnetic ink character referenced to a scaling point set in each character;
   recognizing the read magnetic ink character based on the difference between the reference waveform data after adjustment and the character waveform data;
   when there are three peaks exceeding a specific level in the reference waveform data, setting two scaling points in the waveform of the reference waveform data and scaling the waveform of the reference waveform data referenced to the two scaling points in the adjustment step;
   making a first adjustment that scales the waveform of the reference waveform data referenced to one of the two scaling points;
   making a second adjustment that scales the waveform of the reference waveform data referenced to the other of the two scaling points;
   comparing the difference between the character waveform data and the reference waveform data after the first adjustment with the difference between the character waveform data and the reference waveform data after the second adjustment; and
   recognizing the read magnetic ink character based on the smaller difference.

4. The control method of a recording media processing device described in claim 3, further comprising a step of:
   scaling the waveform of the reference waveform data based on two scaling points when the character is the number 6, number 7, amount symbol A, On-Us symbol O, or dash symbol D.

5. A computer-readable non-transitory storage medium storing a program executed by a control unit that controls parts of a recording media processing device having a magnetic reading unit that magnetically reads a magnetic ink character recorded on a recording medium, and a character recognition unit that recognizes the read magnetic inkcharacter based on comparing reference waveform data for magnetic ink characters with character waveform data acquired by the magnetic reading unit reading the magnetic ink character, the program causing the control unit of the computer to execute steps of:
   adjusting by scaling the waveform of the reference waveform data for each magnetic ink character referenced to a scaling point set in each character;
   recognizing the read magnetic ink character based on the difference between the reference waveform data after adjustment and the character waveform data;
   when there are three peaks exceeding a specific level in the reference waveform data, setting two scaling points in the waveform of the reference waveform data and scaling the waveform of the reference waveform data referenced to the two scaling points in the adjustment step;
   making a first adjustment that scales the waveform of the reference waveform data referenced to one of the two scaling points;
   making a first adjustment that scales the waveform of the reference waveform data referenced to one of the two scaling points;
   making a second adjustment that scales the waveform of the reference waveform data referenced to the other of the two scaling points;
   comparing the difference between the character waveform data and the reference waveform data after the first adjustment with the difference between the character waveform data and the reference waveform data after the second adjustment; and recognizing the read magnetic ink character based on the smaller difference.

* * * * *